United States Patent [19]
Brassea

[11] Patent Number: 5,685,147
[45] Date of Patent: Nov. 11, 1997

[54] BUOYANCY AND THERMAL DIFFERENTIALS ENERGY GENERATOR

[76] Inventor: Angel Brassea, P.O. Box 2186, Calexico, Calif. 92231

[21] Appl. No.: 491,291

[22] Filed: Jun. 12, 1995

[51] Int. Cl.[6] .................................................... F03B 17/02
[52] U.S. Cl. ................................ 60/496; 60/495; 60/641.6
[58] Field of Search ......................... 60/496, 495, 641.6, 60/641.7, 643, 649

[56] References Cited

U.S. PATENT DOCUMENTS

| | | | |
|---|---|---|---|
| 3,715,885 | 2/1973 | Schur | 60/25 |
| 3,916,626 | 11/1975 | Schur | 60/496 |
| 4,028,893 | 6/1977 | Shaw | 60/496 |
| 4,038,826 | 8/1977 | Shaw | 60/641 |
| 4,054,031 | 10/1977 | Johnson | 60/496 |
| 4,196,590 | 4/1980 | Fries | 60/496 |
| 4,363,212 | 12/1982 | Everett | 60/496 |
| 4,498,294 | 2/1985 | Everett | 60/496 |
| 4,805,406 | 2/1989 | Grsetic | 60/496 |
| 4,981,015 | 1/1991 | Simpson | 60/496 |

*Primary Examiner*—Stephen F. Husar
*Assistant Examiner*—Alfred Basichas

[57] ABSTRACT

A system for extracting useful energy from two masses of matter having polarized hot and cold temperatures operates in its primary embodiment with a looped circulation passageway having a condensing phase, an expansion phase and s working generally gaseous circulating generative fluid or gas that circulates through the loop. The expansion phase of the generative fluid includes means to heat at least the generative fluid and a relatively standing liquid through which the generative fluid is allowed to buoy up and drive gas pressure turbines, in this case multi-wheeled flotation turbines composed of closable tube segments. The rest of the loop defines a return path that includes the condensing phase in which the expanded gas released by the turbine is condensed before being heated and re-exposed for expansion through said gas turbines again, in a continuous cycle. Net energy output is achieved by heating the generative fluid before it enters the turbine with heat imported from high temperature independent energy sources to create and/or increase the buoyancy power that it delivers to the turbine, while using low temperature sources to cool the generative fluid in the condensing phase.

27 Claims, 13 Drawing Sheets

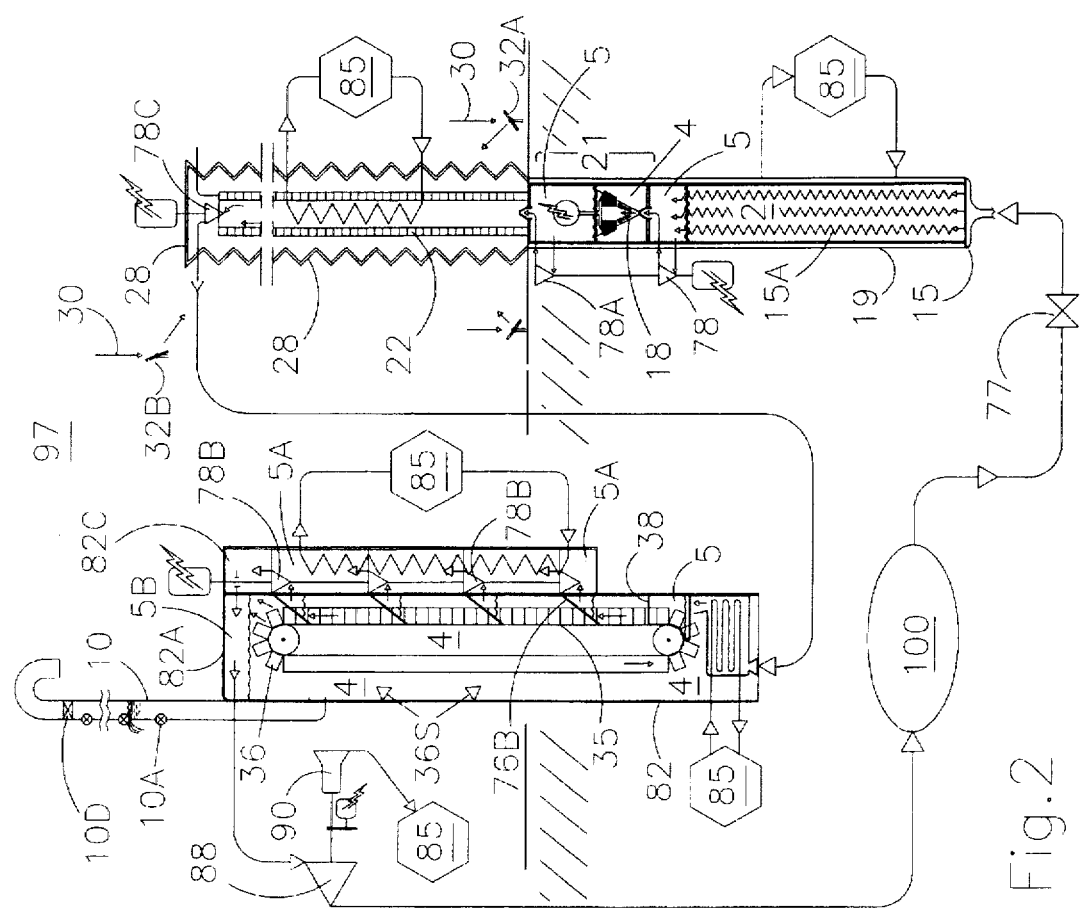

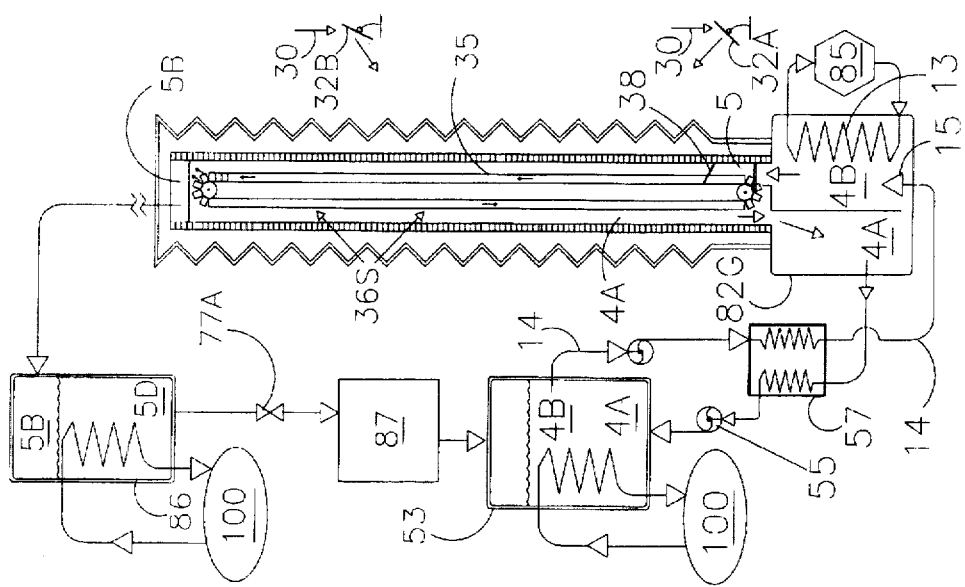
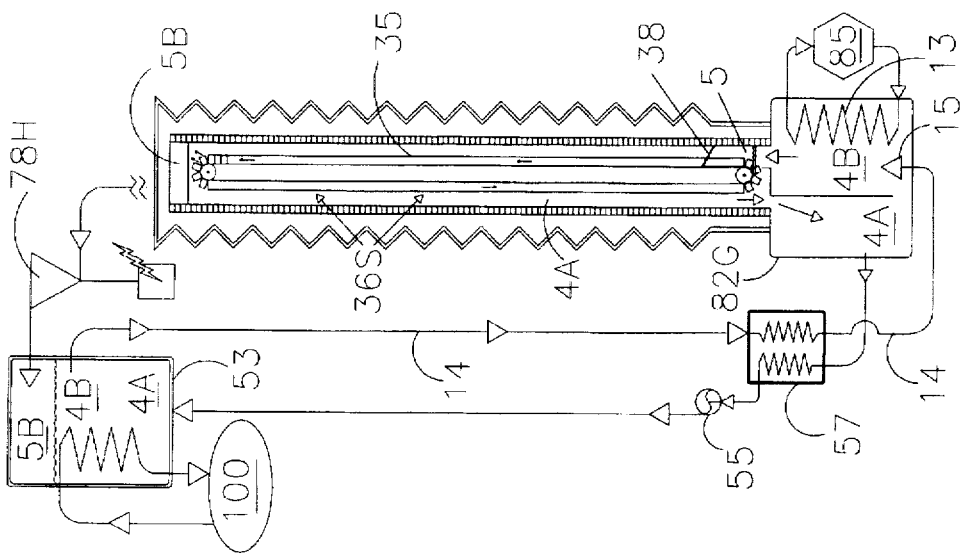
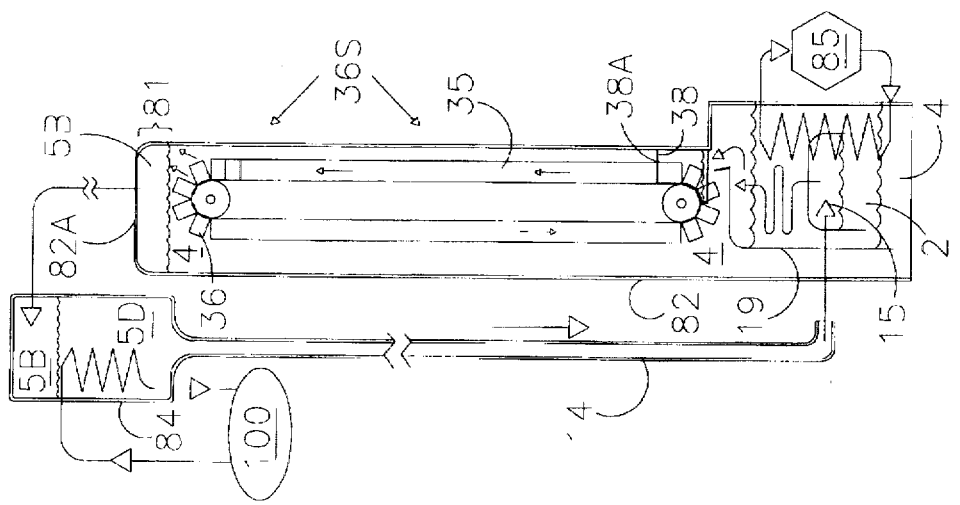

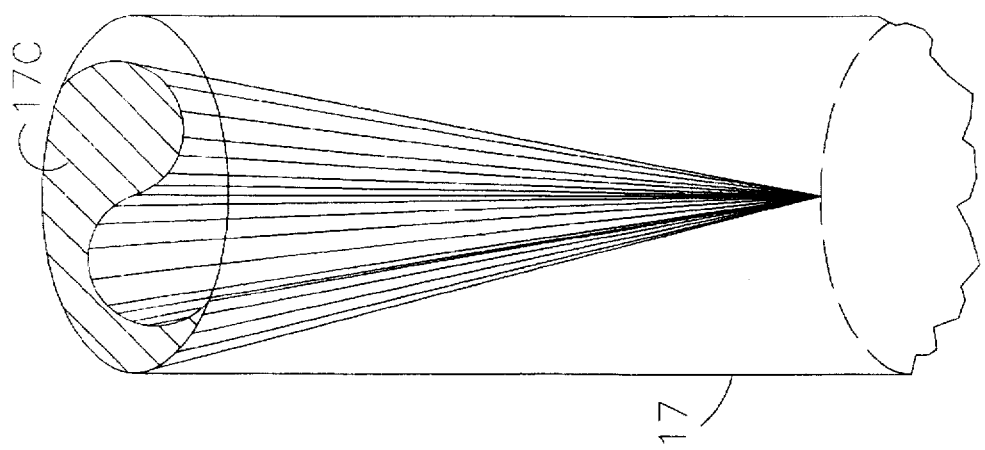
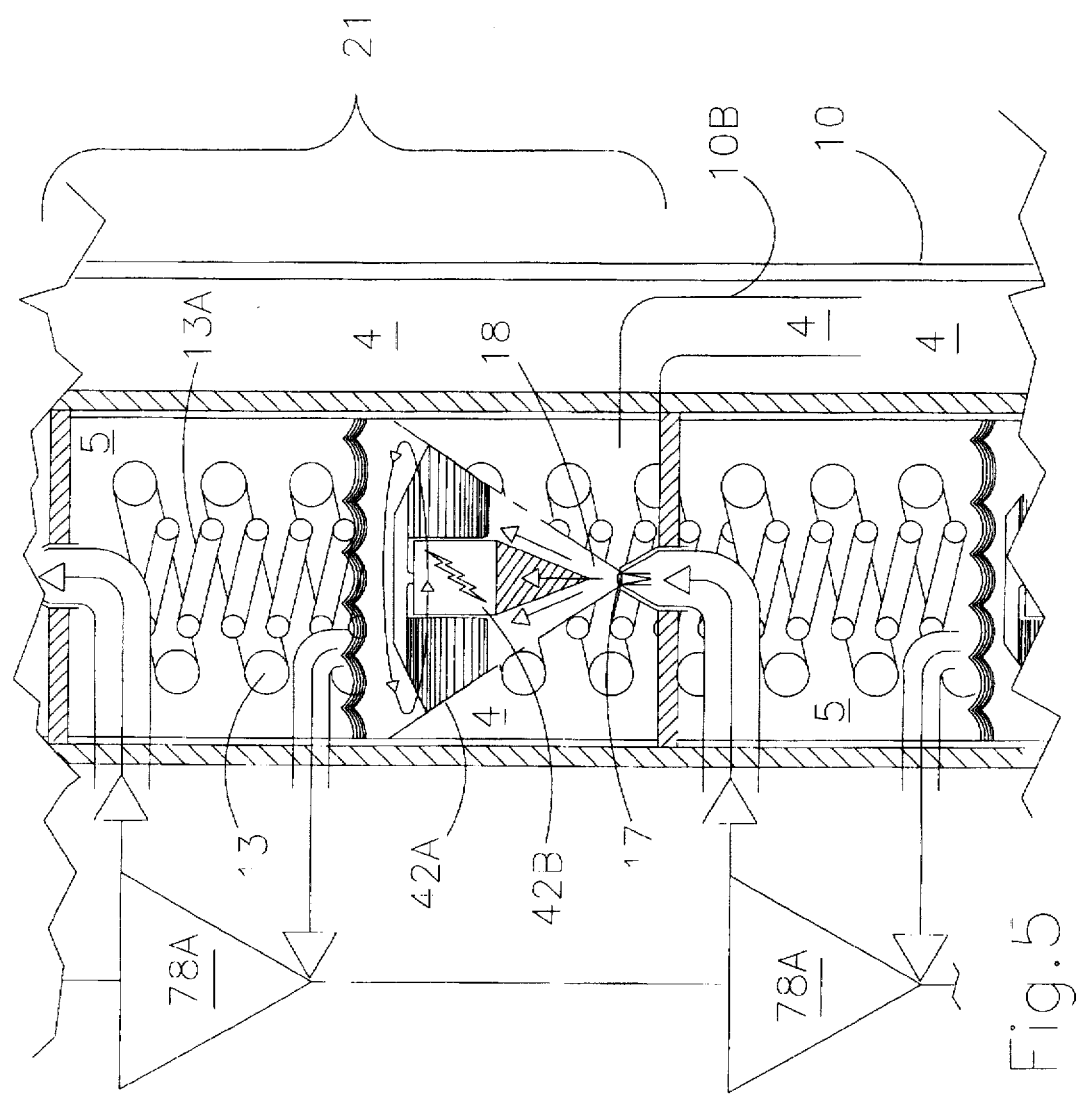

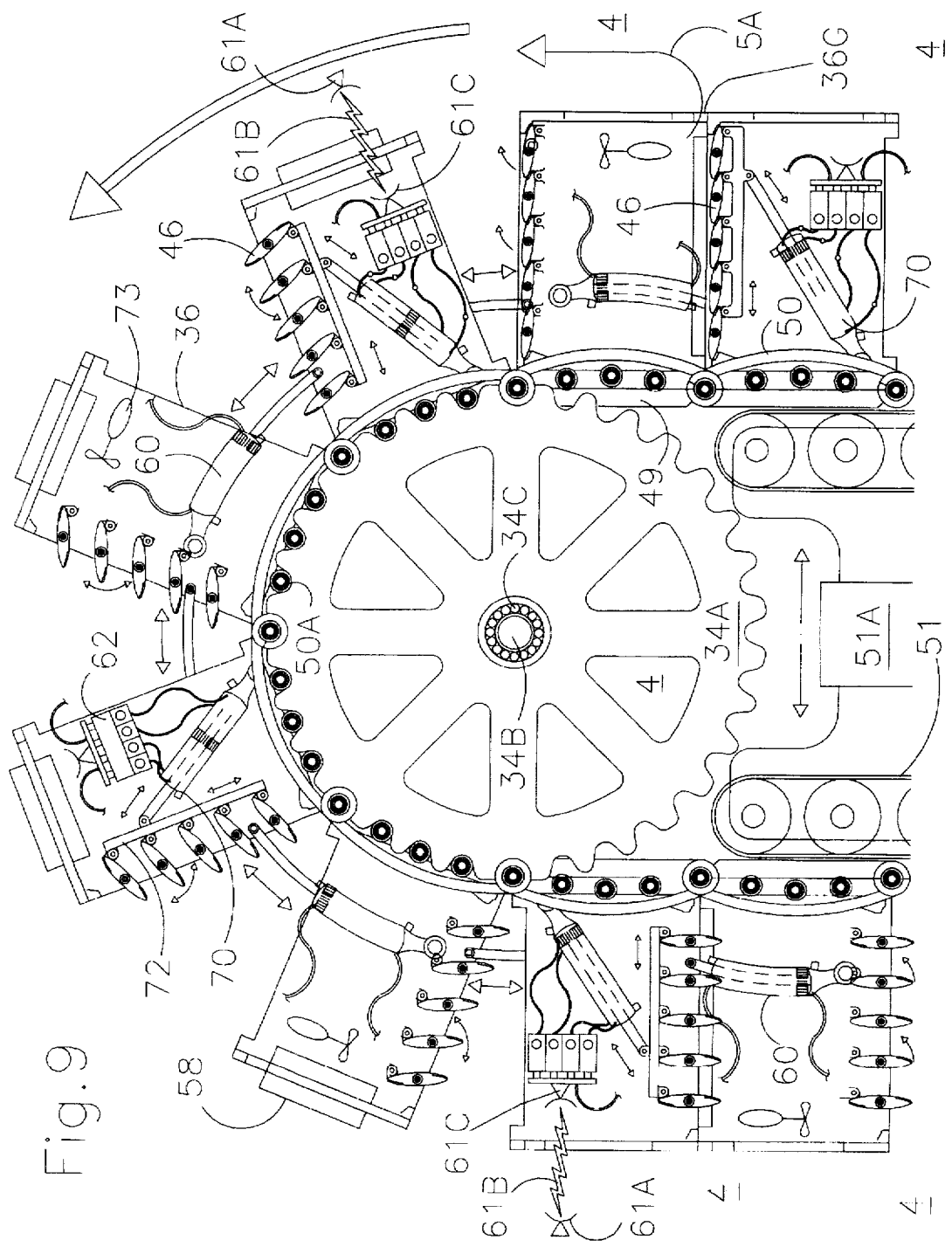

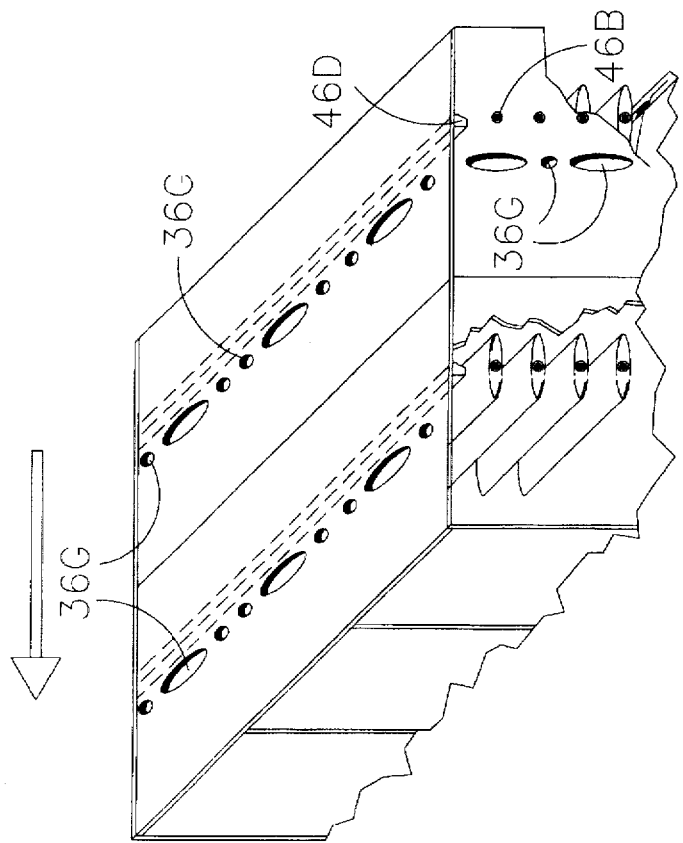
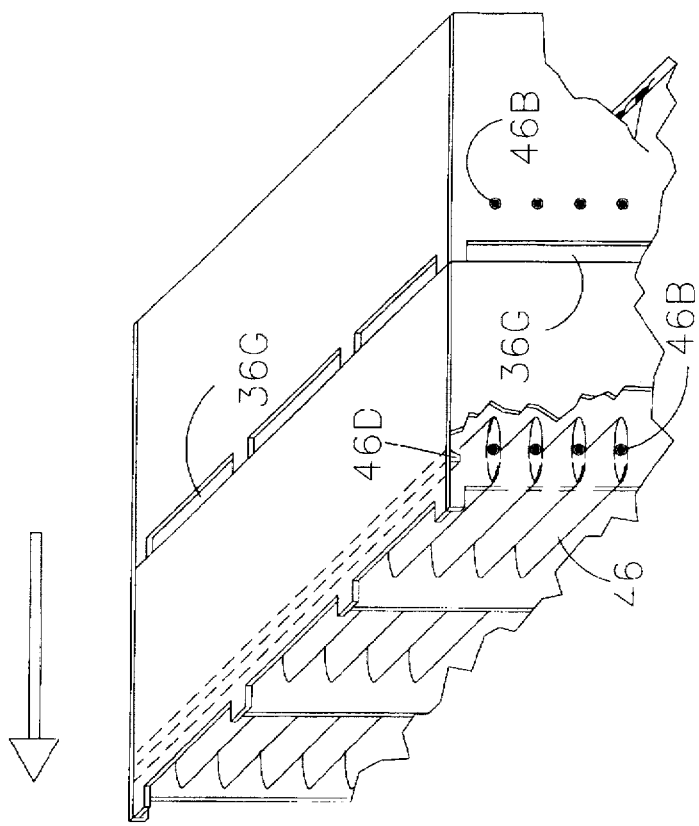

BUOYANCY AND THERMAL DIFFERENTIALS ENERGY GENERATOR

BACKGROUND OF THE INVENTION

There are many different kinds of specialized generators for extracting energy from nature one way or another, including tidal generators, ocean current, wave, and temperature differential generators, lightening generators, waterfall generators, and even a gyro generator.

All of these apparatuses are specialized in their requirements for an energy source, some relying on hot water from thermal wells, others needing a 20-foot tide differential. Current generators require water currents, wave generators require waves, and so forth.

However, one source of energy that is virtually universal is the temperature differential. Relatively cheap waste combustion exhaust gas, relatively low-temperature industrial heat discarded as a by product, geothermal and solar heat are sources of thermal differential when paired specifically with cool ocean or river currents or wind can be harnessed and transduced into electricity. Stratified ocean layers, and night/day differentials in deserts offer energy opportunities. All that is needed to produce energy, aside from a mechanism to do it, is a temperature differential between two masses as set out in the second law of thermodynamics.

A government effort dubbed "OTEC", for "Ocean Thermal Energy Conversion" has achieved limited success with ocean thermal differential, reaching at least break-even outputs, which is rather impressive considering the limitation on efficiency predicted by the second law of thermodynamics based on the relatively narrow temperature spread. Nonetheless this system is based on the continuous availability of the hot and cold temperature sources and as a very large fixed plant, no doubt must be worked all the time to have a hope of breaking even commercially.

There is a need for a versatile energy producing system buildable for one or more houses or cities capable of taking advantage of these limitless polarized temperature combinations to efficiently produce clean, competitive energy from mixed and erratic sources. Along these lines little attention has been paid to the use of buoyancy generators, especially in regard to their use transducing energy from thermal differentials. Buoyancy wheels or turbines have been suggested for limited applications in which gas is escaping from the sea floor, but have not been considered realistic for generalized transduction of thermal energy, which would require the creation of a man-made bubble path for a circulating gas.

Examples of buoyancy wheels are shown by U.S. Pat. No. 4,363,212, issued Dec. 14, 1982, and another example is shown in U.S. Pat. No. 4,981,015 issued Jan. 1, 1991. Both disclose flotation wheels whose design requires more energy input than the output energy they would yield, relying on a nondisclosed source of flotation energy having no creation cost.

SUMMARY OF THE INVENTION

The invention establishes a system which uses any adequately polarized pair of hot and cold temperature sources to produce net output energy. This is accomplished by creating a substantially continuous loop in which a working gas is circulated, one part of which is a substantially vertical riser containing a relatively standing liquid(usually water and hence subsequently referred as "water") through which the gas rises and drives at least a floatation bi-wheel or float-turbine. This vertical riser represents the expansion phase of the gas, where it expands as it rises with the attenuation of hydrostatic pressure. In this part of the loop, heat from the high temperature source is obtained by the gas already under hydrostatic pressure using heat exchange means thus exchanging its expansion to rise by buoyancy, producing more lift for the buoyancy-powered turbine (floturbine) and more pressure for gas pressure turbines and thereby essentially turning heat energy into rotational energy. Similarly the cold temperature source is used for condensing the working gas on the other phase of the loop for almost costless re-injection of the circulating fluid into the standing water in the expansion phase of the loop and allowing it to expand and rise again. The circulating fluid can be a liquid or a gas and is gaseous for most, if not all of the cycle; if a gas, possibly being converted to a liquid briefly for injection into the standing water. It is gas after it is introduced into the expansion phase of the loop so that it expands and buoys responding to its density lower than the water density, to heat and progressively decreasing hydrostatic pressure, thus creating progressively greater buoyancy and pressure when trapped-accumulated by chambers. Upon arriving at the surface of the standing water, the circulating gas is captured and re-circulated to the bottom of the column for re-injection although some embodiments can release it into atmosphere if it is working air with worthless amount of heat. Atomized water can be controledly graduated as mixed with the pressurized gas to enhance "touch" on the turbine blades.

Because the system does not depend on any particular size, elements, temperature range or form of energy other than heat, because it can work from a temperature differential between circulating gas and standing water of at least one degree Fahrenheit and a density differential less than 14 grams by cubic centimeter between same fluids and because it can work at higher or lower speeds and efficiencies, in essence whatever temperatures and quantities the heat energy comes in can be utilized in the system. In this regard, it is flexible and substantially universal in its applicability.

BRIEF DESCRIPTION OF THE DRAWINGS

FIG. 1 is a diagrammatic view of one embodiment of the generator showing the looped circulation passageway with the gas expansion and the condensation phases on the respective right and left sides;

FIG. 2 is a diagrammatic view of the system using a partially underground heating stack and a floturbine assisted by gas spillways positioned in an adjacent chamber;

FIG. 2A is a simplified diagrammatic view of an enclosed floturbine using gravity flow for injection of liquefied working fluid into the column of standing water;

FIG. 2B is a diagrammatic view of floturbine enclosed by a surface multi source heat and solar collector insulated by a transparent cover and showing a method of transduction using two miscible liquids such as ammonia and water wherein the working fluid is re-circulated by absorption;

FIG. 2C is similar to FIG. 2B with the addition of a condenser and an evaporator.

FIG. 5 is an enlarged diagrammatic view of a vortex chamber and pressure differential gas turbines showing the communication passageways;

FIG. 6 is a diagram of a gas nozzle and inner cone for creating a vortex;

FIG. 9 is an elevated cross sectional side view of the floturbine showing the tube segments with gates, passing around upper rotor with one type of gate control;

FIG. 10A is a partial perspective view of two coupled tube segments with louver gates and vents located at the front edges;

FIG. 10B is a partial perspective view of two coupled tube segments with louver gates and vents located between the front and back edges;

DESCRIPTION OF THE PREFERRED EMBODIMENT

With reference to FIG. 1, the system comprises a circulating fluid or gas 5 passing (circulating) through a circulation route in the form of a substantially closed loop. The circulating fluid or gas 5 can be air, a gas or mixture of gases, gas mixed with water vapor(to enhance "touch" in gas turbines), water vapor, ammonia vapor, etc. It is not essential that the working fluid liquefy as the system will work whether it does or not. The circulating fluid of the preferred embodiment can be a liquid or a gas and, as it is gaseous for most if not all the time, it will subsequently be referred also as "gas", "generative fluid", "circulating gas" or "working gas", "working fluid", both in the description and the claims.

Examples of the gas are hexane, water vapor(even buoying in hot liquid water), silicon, air, helium, propane, carbon dioxide, gaseous ammonia, gaseous methylene chloride, etc.

One direction around the passageway is established as the circulation direction. As the gas flows in this gas flow direction it passes through several different stages, including, in progressive order downstream, a condensing phase, a port through which the gas 5 exits the condensing phase to an expansion phase, and a transition section through which the gas 5 passes out of the expansion phase, ordinarily to the condensing phase again.

Figure 3:
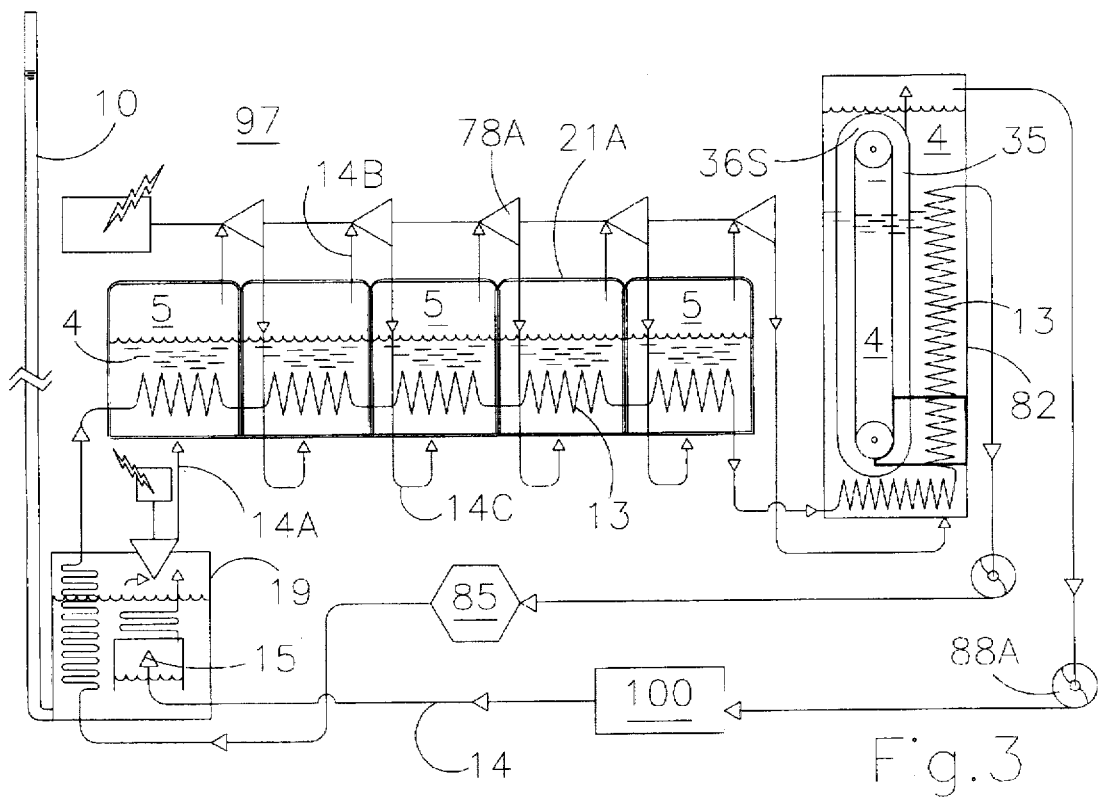
FIG. 3 is a diagrammatic view of an embodiment having a horizontal arrangement of pressure chambers assisted by an external pressure source.

One or more of the motor-driven compressors 88, and 88A of FIG. 3, or even heat pressurizing chambers as upper end of chambers 21, 22, 82, etc. pressurize the working gas 5 principally for condensation. Embodiments large enough to support energy demand considered high may use at least one turbojet engine 90 to drive said compressors 88, 88A. Turbojet engine 90 has an air intake corridor 90A defining a flow of air, and heat exchanging means 92 linked to said corridor 90A for heating up same while cooling the working gas therethrough, and having a conduit 90B for continuous hot exhaust discharge when in use and said exhaust being an additional HTS 85. Compressed and hence at an obvious elevated temperature, the gas starts passing through gas conduit 77A and through the pipe cross sectional reduction valves or conduit reductions 77. The gas must be cooled prior to entering into the expansion phase, and the heat thus extracted may be beneficially used in a distillation plant 94, in co-generative Rankine cycle subsystems 98, in simple domestic heating, etc. In place of or in addition to these heat extracting systems, low temperature sources 100, designated as "LTS 100", can be needed to further lower the gas temperature. LTS 100 represents any low temperature source for this transducer, as those mentioned above(94, 98) and could be coldness derived from currents of fluids as in cooling towers 99, and natural currents as of wind, of water from sea, lakes, rivers, channels, etc. The importance of the cooling is that it reduces the energy required to re-introduce the working fluid into the expansion phase easily overcoming the pressure in the lower portion of the system with reduced energy requirements. Stretchable chamber 76E is a last gas cooling and storing chamber assisted for extendability by a water filled pressurizing vessel 10. It assists valve 77B to control the flux and the amount of gas, and hence, the speed of turbogenerators and assists also in the control of pressure due to amount of gas 5 in the expansion phase. Stretchable chamber 76E, due to its storing feature, specially to store low heat from said erratic sources specially when or where no continuous LTS 100 is available. A stretchable chamber(as chamber 76E) also can be used to store heat from peak periods in its inner pressurized fluids. Of course, substantially all chambers and other circulating means are thermicly insulated.

Hydro pressurizing vessel 10 assists in this system in maintaining a selected pressure (as atmospheric pressure in chamber 83 FIG. 7) in selected chambers which will be referred as "stretchable chambers" because the gas pressurized between the chambers top and the surface of the inner pressurizing liquid connected to vessel 10 can augment and diminish pressure and volume and hence also assist in storing energy excedents as pressurized gas either cooled or heated up. Hydro pressurizing vessel 10 represents, in these related figures, high pressure at the first chamber and the decreasing of pressure downstream the expansion phase chambers which are connected to same vessel 10 by linking pipes 10B.

Hydro pressurizing vessel 10, can be a standing pipe or either a huge chimney containing liquid up to a certain level higher than the surface of the liquid inside the chamber or chambers assisted. The flux through pressurizing vessel 10 can be regulated and even closed by a valve 10D thus stopping said stretch ability. Chamber 76E storage feature is also needed at times when storage is needed to withdraw the gas 5 from expansion phase for maintenance, etc.

After the gas has been compressed and cooled, it is injected through the port 15 into a column of standing water 4 supported by a reservoir 82. Said standing water 4 can be standing in a vessel, basin, etc. or can be running water in a channel, river lake sea, etc. and it is not indispensable to be man-heated. At the moment of injection, the gas must be at least one degree Fahrenheit less than the temperature of the water 4 and hence it will have a smaller volume per unit compared to the volume it would have at the temperature of the water to have profit from injection. This column of standing water is "standing" only in the sense that it does not circulate along with the gas, but it could be circulating on its own as part of the heat exchanger function. Similarly the "water" could be any liquid as oil, diphenyl, mercury, gasoline, fused salts, etc. that does what water does as described herein, so that the term "water" is used both in the description and claims to describe the standing fluid in the expansion phase, the term is meant to encompass all workable liquids, "water" being used for simplicity of description and because water would be the most likely candidate. The "reservoir" could be anything from the sea bottom to a vertical totem-like cylinder, the functionality criterion being that it is established with a vertical height adequate to allow the float turbine to operate. The generative fluid can be any suitable fluid and, as can be observed, there are many adequate combinations of fluids having density differentials of less than 14 grams per cubic centimeter which may be used in this invention. Standing water 4 may be treated against bio-buildup, and may incorporate a buffer liquid 2 in a first injection chamber 19(better shown by FIG. 4) which receives the compressed gas from the port 15. This buffer liquid 2 is high heat transferring, has a freezing point lower than the standing water 4 and, maintained in a buffer zone, permits the gas 5 to warm before contacting the water 4 so that the coldness from cold gas just injected does not freeze the standing water 4.

The gas 5 is then conveyed downstream (also clearly shown by FIGS. 2 and 5) through an optional conventional gas turbine 78 to a vortex generating nozzle 17 in other chambers 21(FIG. 5) where the rotational energy of vortex 18 in chamber 21 is transduced by vortex turbine blades 42A and generator 42B, and the gas then accumulates in the upper part of said vortex chamber 21 from which it passes through conventional gas pressure turbine 78A. A series of the chambers 21, representing stages between turbine transduction, can be arranged in a vertical stack as shown in FIG. 1, or in a horizontally distributed array as shown in FIG. 3.

Figure 2E:
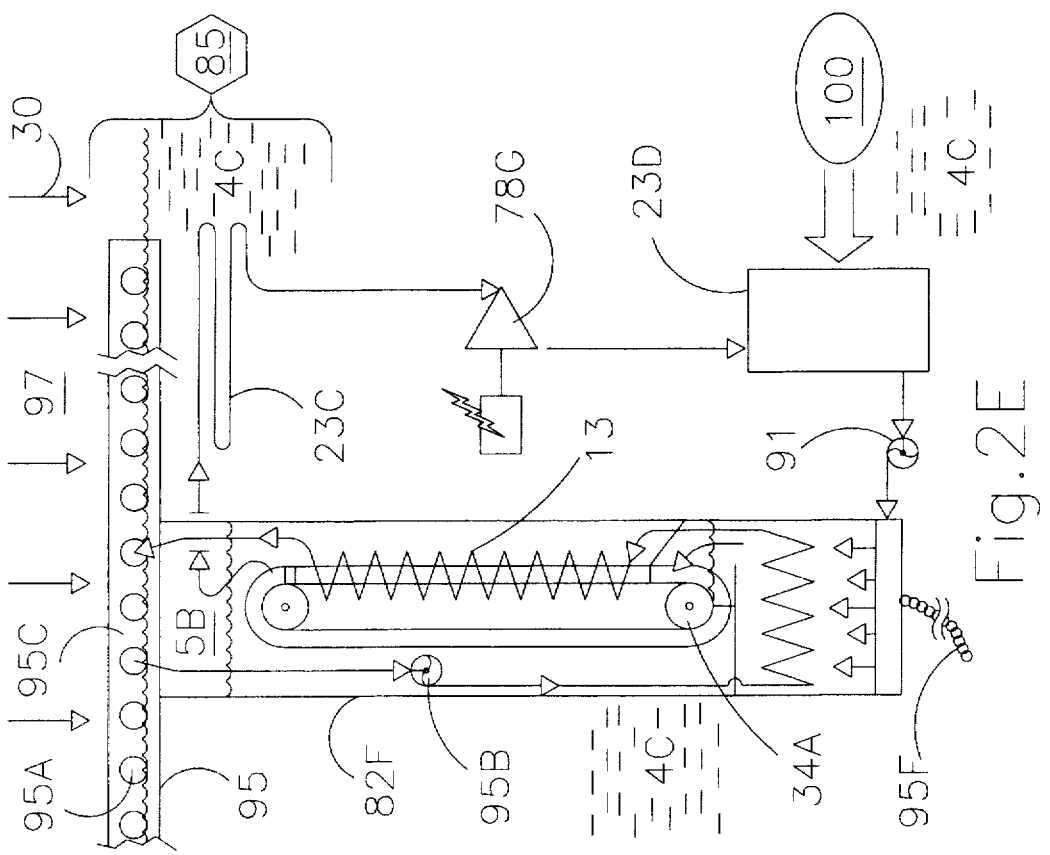
FIG. 2E is a diagrammatic view of an ammonia/water mounted suspended from a solar raft.

For heating gas 5, high temperature sources(HTS) 100 are used. An alternative could be the use of solar farms as those used by "Luz international" in the Mohave desert(not shown) where gas 5 would be passed along tubes, each tube heated up by its own heliostale. Of course treated oil can be circulated through said solar farms and the chambers of this energy transducer to heat the gas 5(in situ) in a chamber interposed in the expansion phase. Another alternative is to pass the gas 5 through other solar collecting means such as solar rafts(shown in FIG. 2E), solar ponds and even conventional solar collectors; or further being passed through geothermal, residual heat, etc. In the preferred embodiment, the gas 5 may be passed through a multisource heat collector 22(FIGS. 2, 2B) as one option, which may receive the heat from said high heat sources through fluid conveying heat exchanging means. The collector can be positioned horizontally or vertically, and either deployed in a subsurface mode, or over surface level. Also, as shown by FIG. 2, in a solar-enhanced embodiment the heat collector 22 is also a solar collector, to receive heat from sources above mentioned. Multi source heat collector 22 will receive heat not only from geothermal, combustion, residual heat, etc., but also directly from the sun through a double walled transparent insulating shelter 28 and reflected by heliostats 32A and 32B, shown in FIG. 2.

The gas 5 thus heat-hydro pressurized, depending on temperature and pressure, may either be conveyed directly to work in the buoyancy harnessing turbine, or "float turbine", "floaturbine" or "floturbine" 34–36 later defined(clearer in FIG. 2D), or through another pressure differential turbine section 78C on its way to the floturbine 34–36. The heating column 22 (further described in FIGS. 13A–D) is an alternative to the use of the conventional heat exchangers 13 and 13A(FIG. 5), at least in part heating-up the expansion phase from said high temperature sources HTS 85. The gas 5 may be further heated in a heat exchanging chamber 40 or may directly enter and accumulate under a hood 38 forming the foot and the beginning of a substantially vertical gas column enclosed by vertical rising length 35, powering section of the floturbine 34–36. Hood 38 furnishes the floating gas 5 to the vertical rising length 35 of the floturbine 34–36. The vertical length 35 thus revolves a closed-loop tube 36S composed of adjacent closable tube segments 36 mating hinged mutually and coplanarily, and mounted by their inner side on at least one upper rotor 34A–B parallelly aligned to at least one lower rotor 34A–B basically formed by rotating crossed beams, cylinders, or, as in the proferred embodiment, by sprocket wheels which in turn are mounted in parallel axes 34B thus forming said at least one upper rotor and one lower rotor 34A–B. Each rotor 34A–B, also as a rotational energy connecting element, is mounted through suitable bearing means 34C(FIG. 5) on a frame having at least one supporting column(other embodiments will have at least two supporting walls, like those build in tandem) thus all together forming the support structure of the closed-loop tube 36S; the support structure and the closed-loop tube 36S thus in turn define the floturbine 34–36(shown by bracket in FIG. 2D), which is a turbine for transducing the buoyancy power of a gaseous fluid rising in another fluid, taking advantage of density differentials enhanced with application of temperature differentials.

Figure 2D:
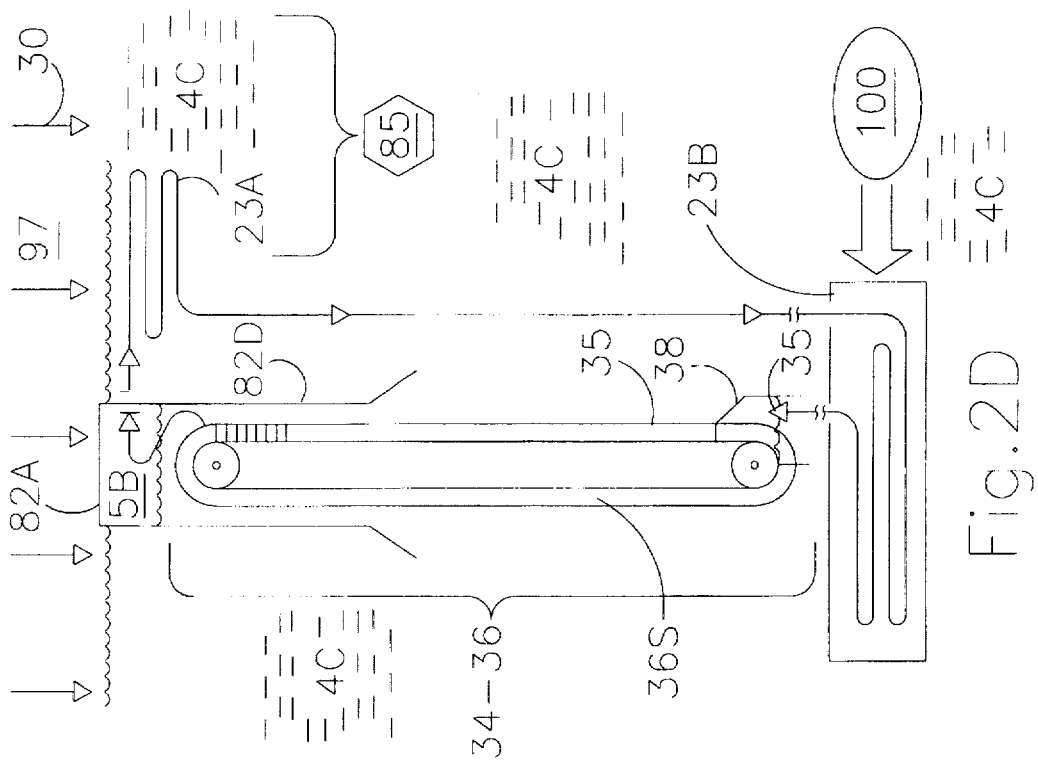
FIG. 2D is a diagrammatic view of a floturbine and an inverted hopper partially enclosing same, both substantially submerged.
Figure 8:
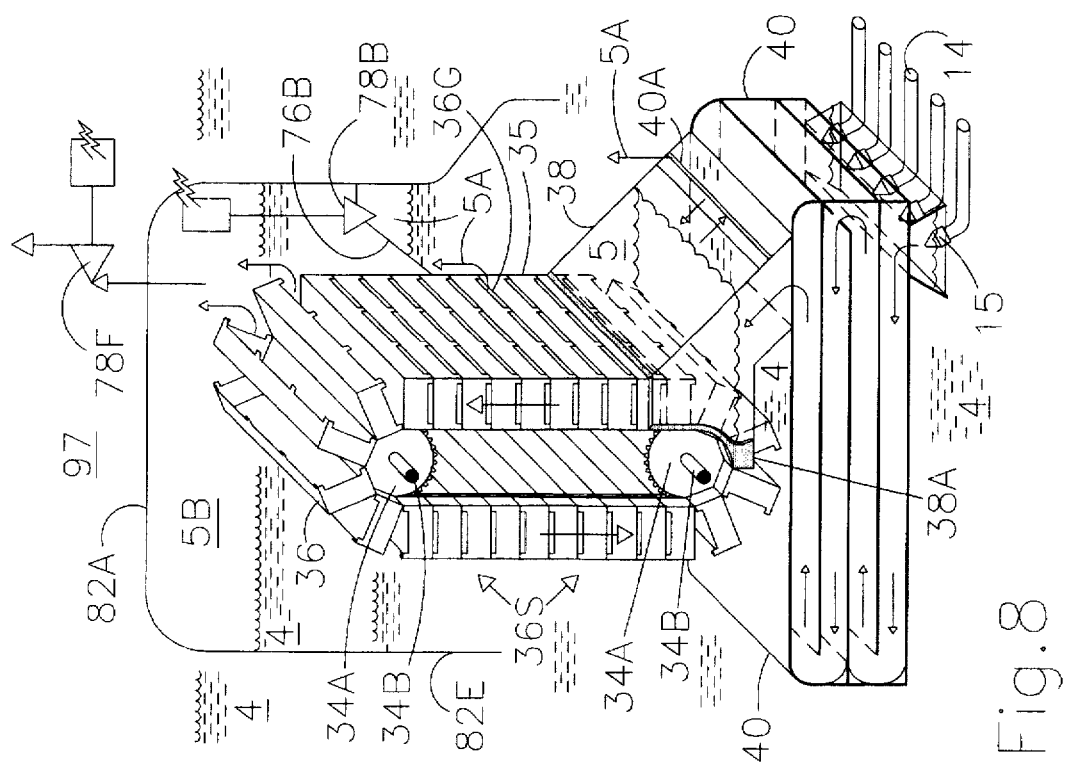
FIG. 8 is a partial diagrammatic and perspective view of the floturbine, a gas heater beneath same, floturbine spilled-gas transducers and a partial enclosure trapping and pressurizing the gas.
Figure 7:
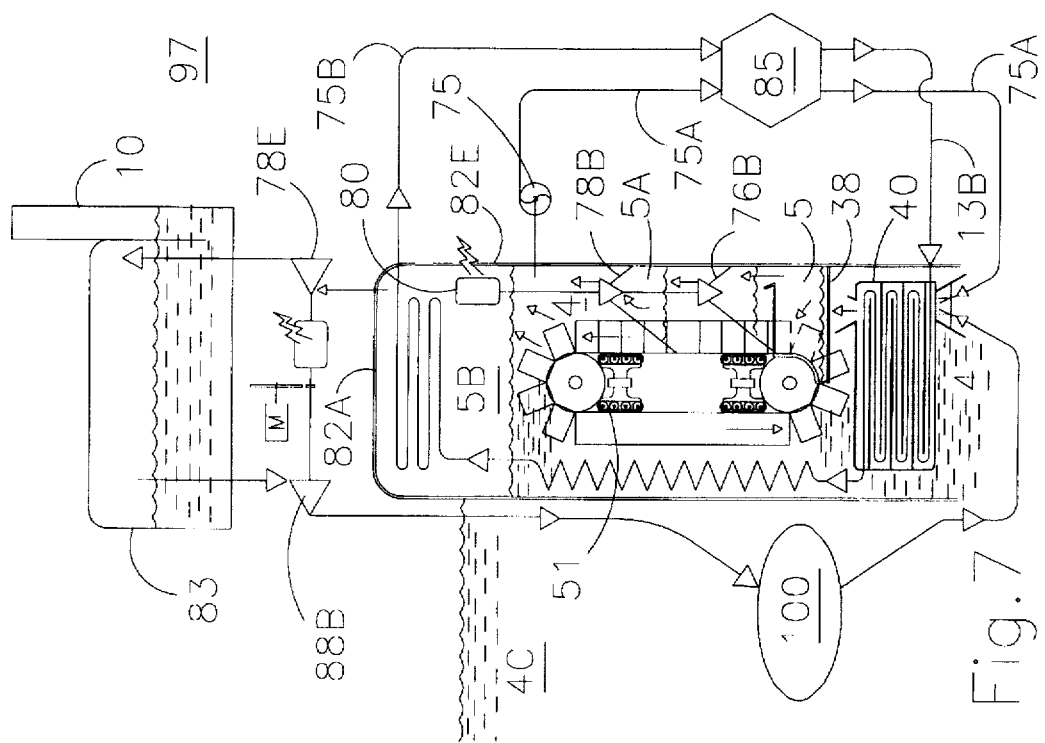
FIG. 7 is a diagrammatic view of an embodiment submerged in water principally showing a top heat pressurizing chamber, open bottom enclosure, a turbo generator in tandem with a compressor and a stretchable atmospheric pressure chamber.

The gas 5 enters the trap and gas accumulating and directing hood 38(also dubbed hood 38 or inlet hood 38) preferably at the lowest point of the rising length 35 around the lower rotor and subsequently enters into the vertical rising length 35 of the revolving closed-loop tube 36S. The tube segments 36 may either close their gates 46 near the upper end of the vertical length (as shown by FIGS. 2A–E), or before leaving the inlet hood 38(as shown by FIGS. 2, 7, 8). In the first case there is a continuous open plenum defined by the rising length 35 closed only at its upper end, whereas in the second case each segment of the vertical rising length 35 is a closed-gate separate compartment with its own separate charge of gas. In this second case is more notorious the gas 5 further expansion as it rises in the water, especially if overfull since will spill gas 5A through vents 36G(FIGS. 8, 9, 10, 10A–B) set in the walls of the tube segments 36. The spilled gas 5A is captured by secondary hoods 76B and transduced by turbines 78B.

The combination of floturbine 34–36, hoods 38 and gas pressure turbines 78B–F defines a flothermic transducer (FTT) and can be substantially housed in a chamber 82, submerged in a reservoir of water or other suitable liquid.

The gas 5 coming up from FTT turbines may either be released into the atmosphere 97 or may be accumulated in a stretchable chamber formed between the surface of the water 4 and said roof 82A of the chamber 82 specially if profitable heat pressurization of the heat energy can be attained to drive the pressure turbine 78C(FIG. 2) as well or at least if the accumulated heat can be further profitably used. If pressurized, a turbine section 78E (FIG. 7) will harness this last gas pressurization from the expansion phase for electricity and/or to drive compressor 88B. Increased absolute pressure in a 100% closed FTT would harm buoyancy if no significant amount of heat is furnished to the gas 5 buoying up.

FIG. 2 shows a modification of FIG. 1 wherein the turbines 78B are each located in a different chamber 82C divided in pressurized segments for each turbine that transduces the pressure of gas 5A spilled by the closed tube segments 36 while rising in the liquid 4. Other embodiments do not segment column 82C and accumulate spilled gas 5A against one upper turbine 78B.

Multi source heat collector 22, further defined in FIGS. 13A–D, shows its over-surface appearance covered by double-walled transparent insulating shelter 28, zig-zagged for better reception of solar rays 30. Pressurizing vessel 10 in this case not connected to chamber 19, flexibly controls pressure inside the chamber 82, assisted by liquid spillage gates 10A which allow enclosure 82 to accumulate heat pressurized gas 5B(as in FIG. 7) controledly manipulating the pressures inside enclosure 82, without significantly increasing hydrostatic pressure, resembling an open bottom enclosure 82 submerged in a wider body of water.

FIG. 2A shows an embodiment having injection by gravity flow wherein the gasified circulating fluid 5 rises through optional turbo generator(not shown) pressurized principally by heat up to a selected height which depends of its specific gravity as to perform costless reinjection of the liquefied circulating fluid 5D. A condensing chamber 84 converts the pressurized circulating gas 5B into a cool liquefied fluid 5D. Due to the 24 depth of the vertical portion of duct 14 containing said liquefied fluid 5D, higher hydrostatic pressure is accumulated by gas 5B at the port 15 than the hydrostatic pressure of the water 4 at the same port 15, thus having hydrostatic pressure by depth the circulating gas descends by gravity along pipe 14 and substantially costlessly re-enters the expansion phase through port 15.

As shown by FIG. 2B, injection by absorption in a simple method is used where two miscible fluids are used; the circulating fluid 5 can be a low boiling point liquid as ammonia and the standing fluid 4 can be water and more exactly weak ammonia liquor. the mixture of ammonia and water(ammonia liquor) is heated by heat exchanger 13 at the bottom of their container 82G. The ammonia being more volatile than the water, rises in the water by buoyancy gradually expanding according to heat and gradually less hydrostatic pressure. The hood 38 traps an directs volatized gaseous ammonia 5 into said vertical rising length 35 thus rotating by its buoyancy the closed-loop tube 36S. Subsequently, the gaseous ammonia 5 is directed through gas expansion turbine 78H condenser-absorber 53 which contains ammonia liquor 4A which has circulated there by means of one or more pumps 55 from a boiler chamber 82G via a heat exchanger 57. In condenser-absorber 53 the ammonia is absorbed into said liquor and the strong liquor 4B thus formed is conveyed for re-circulation toward the boiler chamber 82G through the heat exchanger 57 where it draws some of the heat from the weak liquor 4A passing through. FIG. 2B also shows the floturbine 34–36 inside a Multi source heat collecting chamber 22 positioned above surface to receive solar rays through its zig-zagged transparent shelter 28. A single metallic tube may substitute the concentric tubes of chamber 22.

Shown by FIG. 2C, another embodiment would be about the same as for FIG. 2B, except that between container 22 and said absorber 53 are interposed a pressurized condenser 86 and one or more evaporators 87, obviously for refrigeration purposes, thus adding more usefulness to this energy converter. The pressurized ammonia from pressurized condenser 86 liquefies in same and expands through expansion valve 77A thus entering evaporator 87 where pressure is significantly reduced by its connection to the absorber 53 and liquid ammonia evaporates thus drawing heat from its surroundings. Into the absorber 53 the circulating gas 5 this time working as gaseous ammonia is absorbed by said weak ammonia liquor 4A thus continuing the cycle explained in FIG. 2B. Different embodiments may use water as the circulating fluid 5 and lithium bromide as the standing fluid 4.

FIG. 2D shows a floturbine 34–36 in open waters 4C, suitable for OTEC and using a working gas 5 immiscible or not with the standing liquid 4C depending on temperatures handled. The gas 5 coming from condensation enters nonman heated liquid 4C(preferably of relatively slow currents) gathers heat from upper layers of water 4C and conductivity of tube segments 36, expands, buoys and powers the floturbine 34–36 which is enclosed by open-bottom chamber 82D to control and pressurize the gas 5 after exiting floturbine 34–36. The pressurized gas 5B, at least for reinjection, can be further heat-pressurized between the surface of the column of standing water 4 and the roof 82A of hood 82D by using hot surface water 4C through inner heat exchanger(not shown) similar to those of FIG. 7. Absolute pressure diminishing gas expansion in the liquid 4C (as it would be the case when floturbines are completely enclosed due to this upper-inner pressurization specially if no additional heat is supplied to the rising gas 5) is overcomed supplying additional heat to the hydro pressurized just injected gas 5. From said upper-inner pressurization, the gas 5 is conveyed and further heat-pressurized through heat exchanger 23A within hot surface water 4C outside enclosure 82 toward heat exchanger 23B, subjected to lower cold waters, for its condensation and re-introduction in the floturbine 34–36. For times when pressure for injection in hood 38 is low, a pumping device(not shown) can be added at the end of the condensing pipe to assist in gas 5 introduction into the floturbine 34–36. The difference in density and the hotter layer of liquid at the injection level will buoy up the gas 5. In other very elemental embodiment, a compressor for air injection(not shown) can be used to assist in condensation of air being condensed-injected in the expansion phase through cooling means, to achieve efficiency.

FIG. 2E shows a floturbine 34–36 also for open water, enclosed by buoyant chamber 82F suspended from a buoyant solar raft 95 as one of the high temperature sources which can be assisting this embodiment. Some embodiments can use adapted ships(not shown) to substitute the solar raft 95 and the complete structure can be relatively hold in place by anchoring attachments 95F or any other kind of suitable relatively flexible attachment according to conditions of the location. This design uses a fluid immiscible with water like ammonia as the working fluid 5. A heat transferring fluid like treated oil is heated up within heat-exchanging pipes 95A and, using pumps 95B, conveyed throughout enclosure 82F to heat up fluids within same and re-circulated to said solar raft 95. Solar raft 95 can gather the heat from several heat sources as surface water, geothermal and principally from the sun(and from combustion when needed) and accumulate said heat mainly in a suitable heat transferring bed 95C. After exit from floturbine 34-36, gas 5 is further heat pressurized at the top of the container 82F and optionally within surface hot waters 4C in heat exchanging pipes 23C, subsequent to which gas turbo generator 78G produces additional energy. The gas 5 is then condensed with cold water from lower temperature layers in condenser 23D and injected with optional assistance of pumps 91 into the expanding phase to be re-heated and re-circulated.

FIG. 3 shows a horizontal arrangement of chambers, the first injection chamber 19 having the highest pressure. Each chamber has one or more turbines 78A preferably connected in tandem and with generators. All chambers are heated up by HTS 85 through pipes 13. From condensation by LTS 100, the gas 5 is conveyed by circulation means 14, 14A-C, progressively heat-pressurized in each chamber and expanded through turbo generators 78A and closed-loop tube 36S of floturbine 34-36 after which it is pressurized by compressor section 88A for condensation and reinjection through port 15.

Figure 4:
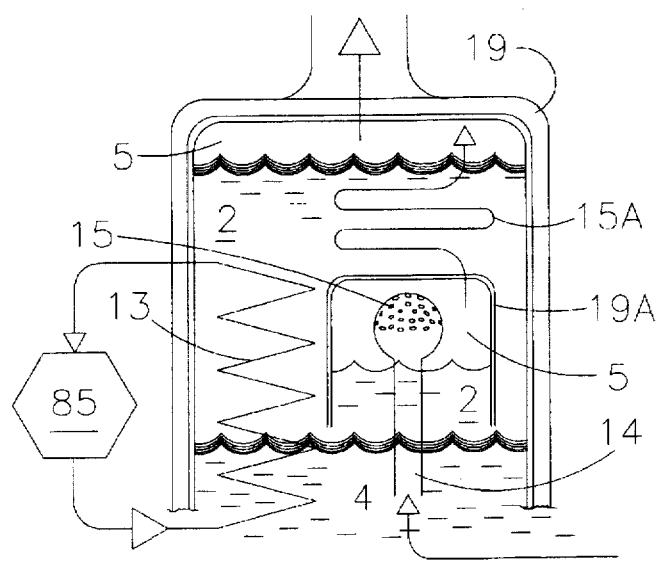
FIG. 4 is a diagrammatic view of first injection chamber and the port region which separates the condensing phase from the expansion phase.

FIG. 4 shows an option, for a better heat-expansion (similar to heat expansion shown in FIG. 2) where within first injection chamber 19 the liquid 4 pressurizes the anti-freezing thermal buffer liquid 2 and circulating gas 5 against the top of the chamber 19. Heat exchanger 13, conveying hot fluids from high temperature sources 85 heat up the inner fluids. The buffer liquid 2 is of lower freezing point, of higher heat transferability and, in this case, of lighter weight than first liquid 4. The gas 5 is introduced to expansion phase by port 15, in this case immediately within a gas spreader 19A set within or prior(FIGS. 1,2,etc.) the buffer liquid 2. The gas 5 is then conveyed by sinuous heat exchanging pipes 15A through the buffer liquid 2 for longer and better heat reception. Subsequently, gas 5 is pressurized against the top of chamber 19 for conveyance to at least one turbo generator(as shown by FIGS. 1, 2,#78).

FIG. 5 shows a chamber 21, one of several vertically aligned chambers (or even horizontally as in FIG. 3) forming a column whose inner liquid 4 and gas 5 are heated by heat exchanger 13, 13A. This chamber 21 receives the gas 5 through a nozzle 17 assisted by helical cone 17C of FIG. 6 at its outlet for creating a vortex 18 while ejecting the gas 5. Other embodiments may use several openings or nozzles with no helicoidal cone 17C, but aligned and directed to create the same vortex 18. The spin power of vortex 18, is harnessed by turbine 42A connected to a generator 42B and may be connected in tandem to other vortex turbines and generators. Vortex chambers 21 can be substituted by other chambers similar to first injection chamber 19 of FIG. 2. The gas 5, pressurized at the upper portion of the chambers 21, is conveyed through a gas pressure turbine 78A into the next chamber 21, or into chamber 22(FIGS. 1,2) or directly into the floturbine 34-36. Chamber 21 also can be a stretchable chamber if assisted by a water-filled pressurizing pipe 10.

FIG. 7 shows a submerged transducer within an open bottom chamber reservoir 82E which is, in turn submerged in waters 4C. Also shown is a chamber heat exchanger 40 to heat the gas 5. A pump 75 continuously re-circulates the liquid 4 through circulating means 75A to be heated by any of the mentioned HTS 85, and re-injects same at lowest level of the stack. FIG. 7 also shows an option where the gas 5, further heat-pressurized against the roof 82A of the enclosing chamber 82E, is released to atmosphere pressure inside stretchable chamber 83 through turbo generating means 78E in tandem with the compressor section 88E. The stretchable chamber 83 permits the drop of pressure while preventing waste of gas and prevents waste of the heat. Conveying rollers 51, attached to said support structure, assist to maintain in smooth equilibrium the movement of the closed-loop tube 36S.

FIG. 8 shows a perspective of the floturbine 34-36 and lower heat exchanging chamber 40; the floturbine 34-36 partially enclosed by the chamber 82E resembling a main hood or inverted hopper. As the gas 5 enters through pipes 14 and nozzles 15, it rises circuitously through heat exchanging chamber 40 and becomes heat-expanded. The expanded gas 5 continues rising to form the gas pocket under hood 38 assisted by anti-spilling means 38A and forms the beginning of the gas column contained in the vertical rising length 35 of the closed-loop tube 36S of the floturbine 34-36. The hood 38 may have an adjustable opening 40A if needed for spilling gas 5A captured by hood 76B and harnessed by turbines 78B. Having gates 46 closed since the inlet hood 38 according to this embodiment, the vents 36G of the rising tube segments 36 will vent the gas 5A whose buoyancy will also be transduced by gas pressure turbines 78B assisted by hoods 76. Pressurized against the top 82A, the circulating gas will further generate energy through turbine 78F while released into atmosphere 97.

FIG. 9 shows the tube segments 36 turning at the upper rotor 34-36 and an option of motive means to actuate gates 46 where their separation at their outer side actuates hydraulic cylinder 60 by the separation of their ends which are attached to two adjacent tube segments 3. Hydraulic cylinder 60, in turn, stores hydraulic power this time in servomechanism 62. Given a magnetic, electric, electromagnetic or a light signal 61B between signal source 61A and sensor 61C, servomechanism 62 sends the hydraulic power to move the piston of cylinder 70, connected to louver linking rod 72 and thus pivoting louver slats 46 for opening or closing the plenum of the tube segments 36 according to their position. Generator 73 operated by the water 4, provide electricity for the tube segment 36 at least when using said signal 61B(light or electric signal). Different embodiments may use, sliding gates 47(FIGS. 11D, 11E) or winding gates(not shown) in place of said louver gates 46; and also may use sliding gates, or as shown, pivotal gates 58 at the outer side of the tube segments 36. FIG. 9 also shows roller teeth 50A meshing the sprocket wheel 34A. Attached to said supporting structure, roller guides 51 push the plane sections of the inner side 49 assisted by hydraulic means 51A to keep the closed-loop tube 36S travelling smoothly and stabilized along the path, specially if using only one sprocket wheel for each rotor. Other guiding means(not shown), as virtually frictionless beams, panels or even bigger wheels can substitute said roller guides 51 and hydrostatic means 51A.

Figure 10C:
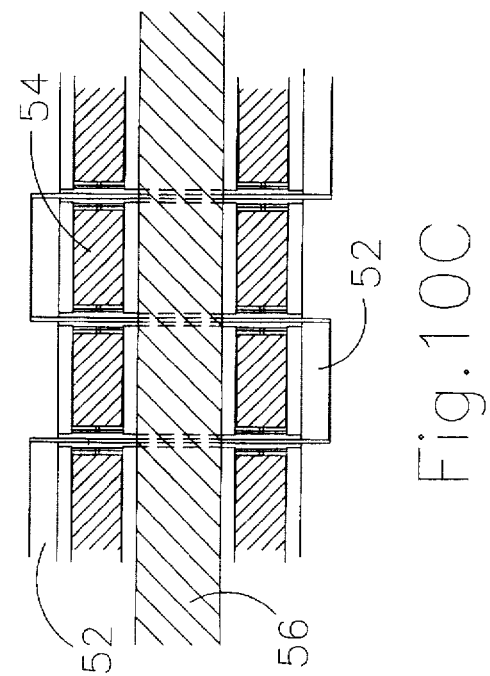
FIG. 10C is a diagrammatic view of coupling hinging teeth showing bearings.
Figure 10:
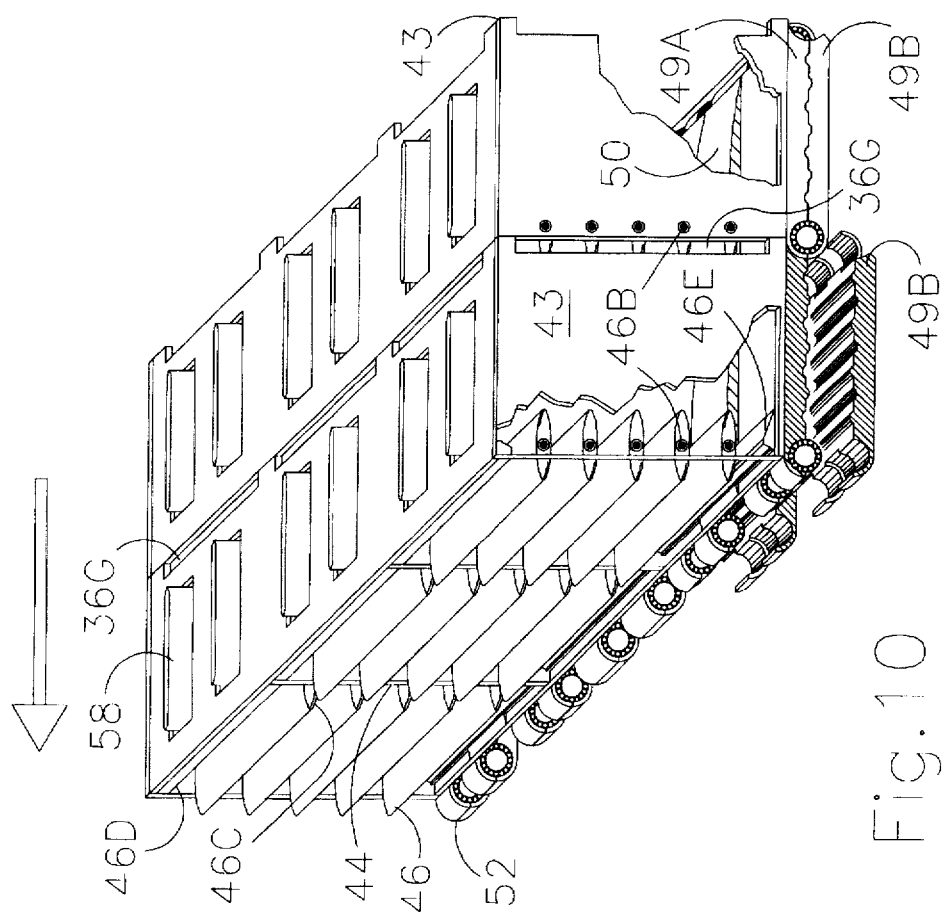
FIG. 10 is a perspective view of a detail of two adjacent tube segments showing louver gates, gas spilling vents at the back edges, mating hinging teeth extending from the inner side front and back edges, and the inner side divided with coupling teeth in each section.

FIGS. 10 and 10C shows two tube segments 36 mating coplanarily with hinges using bearings 54, spindle 56 and showing part of the inner side wall divided in sections 49A and 49B, revealing a method of reposition of the bearings 54 and spindles 56 for the coupling teeth salient from inner side of the tube segments. Other embodiments will use hydrostatic bearings powered by the same hydraulic system shown in FIGS. 11A and 11B. Hydrodynamic louver gates 46 are moved pivotally. Other embodiments may use collapsible gates of one or two blades, not shown, attached to the walls by hinges resembling the doors of a room; or may even use a sliding curtain 47 moved in a corridor 43A(FIGS. 11D, 11E) by chains or racks, sprockets and other obvious motive means(as those explained for FIGS. 11A–C to move the louver gates 46). When the louver gates 46 close, there are butts 46D and 46E to hold the louvers 46 when closed, and seals 46C to resist spillage. The louvers 46 are attached with bearing means 46B to the walls of the tube segment and preferably, but not exclusively, in the position they are shown, perpendicularly to the shoulders of the tube segments 36. For enlargement of the tube segments 36, for resistance of the louver gates 46, for strengthening of the tube segments 46 and even to chamber the inner gate motive means, one or more panels 44 are set between the shoulder walls 43, and the louver gates 46 are also attached to them. The location of the louver gates 46 can be at any place(the front, back and in between front and back) of the tube segment 36 and at any position, provided their function is fulfilled. In an optional embodiment, vents 36G, optionally opened and closed by sliding doors(FIG. 11D, 11E when closing the inner plenum) assist the tube segment 36 to spill away the excess expanding gas 5A while rising in the standing water 4, and specially when tube segment 36 is closed since the inlet hood 38.

FIG. 10A shows an alternative way for locating the vents 36G just adjacent to louver gates 46 at the front of the tube segment 36.

FIG. 10B shows an alternative way for locating the vents 36G just adjacent to louver gates 46 between the front and back edges of the tube segment 36.

Figure 11C:
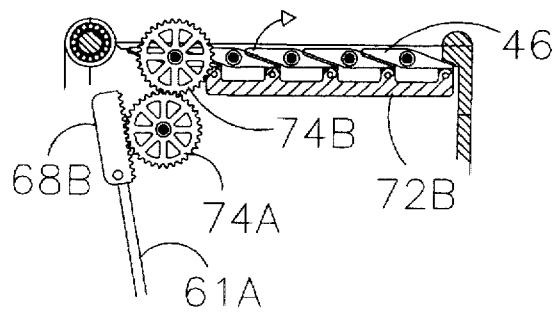
FIG. 11C is yet another alternative embodiment of the actuator means to control the movement of the gates of the tube segments.
Figure 11B:
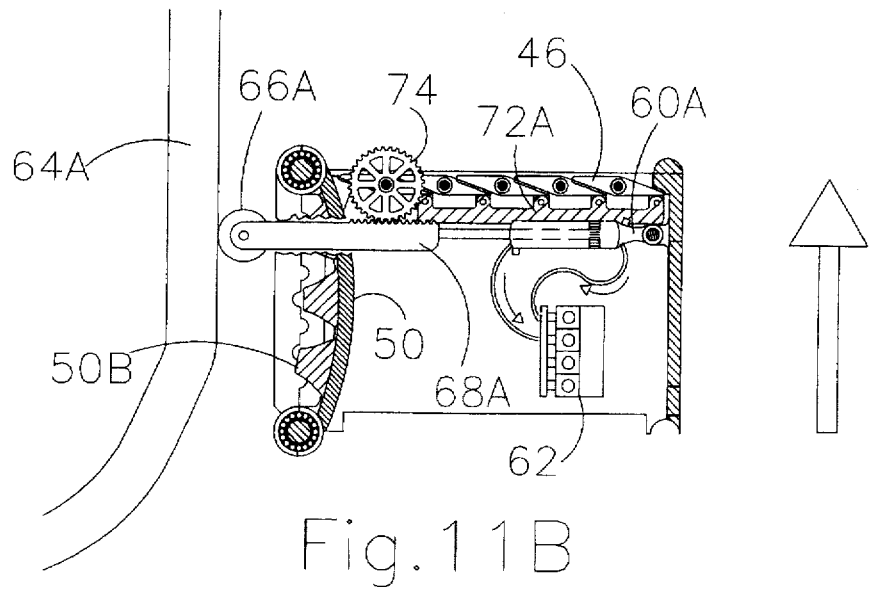
FIG. 11B is an alternative embodiment of the means to control the motion of the gates on the tube segments showing alternative meshing means between tube segments and rotors.
Figure 11A:
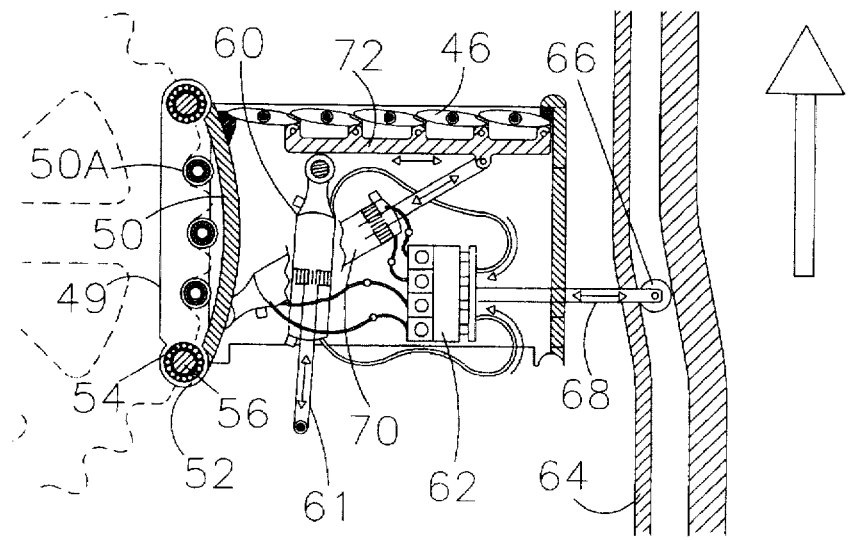
FIG. 11A is an elevation view of the preferred means for controlling the motion of the tube segments gates showing the meshing means between the tube segments and rotors.

FIG. 11A shows a tube segment moving upward, whose servomechanism is triggered by a cam follower 68 assisted by a roller 66 actuated by cam 64. As camfollower 68 moves "up" and "down", the pneumatic-hydraulic servomechanism 62 opens or closes the louver gates 46 by means of cylinder 70 and linking rod 72. Also shown is a cross sectional side view of arcuated section 50 of said side 49 including roller teeth 50A aligned arcuatedly and accordingly to mesh the sprocket-wheel 34A(in phantom).

FIG. 11B shows a tube segment moving upward, where rack arm 68A actuates Cylinder 60A that powers servomechanism 62 which will use the power for moving any movable parts of the tube segment 36 and/or for the mentioned hydrostatic bearings(not shown) of the hinges mating the tube segments 36. Cam 64A actuates roller 66A attached to rack arm 68A which rotates pinion 74 that in turn pivots its attached louver slat 46 connected to linkage rod 72A thus pivoting the other hydrodynamic louver slats 46. Also shown is a cross sectional side view of arcuate section 50, including fixed cogs or teeth 50B also indexed to mesh with the sprocket-wheels 34A.

FIG. 11C exclusively shows mechanical motive means wherein a rod 61A connects to the next tube segment 36 and to a rack arm 68B to rotate a wheel 74A which in turn rotates indirectly by means of a chain, or directly the pinion 74B and consequently the connecting rod 72B and louver gates 46. Other options(not shown) would be at least the use of levers, sprocket wheels or pulleys, chains or velts, etc. moved either by cams or the segments relative separation at their outer sides when turning around the rotors 34–36.

Figure 11E:
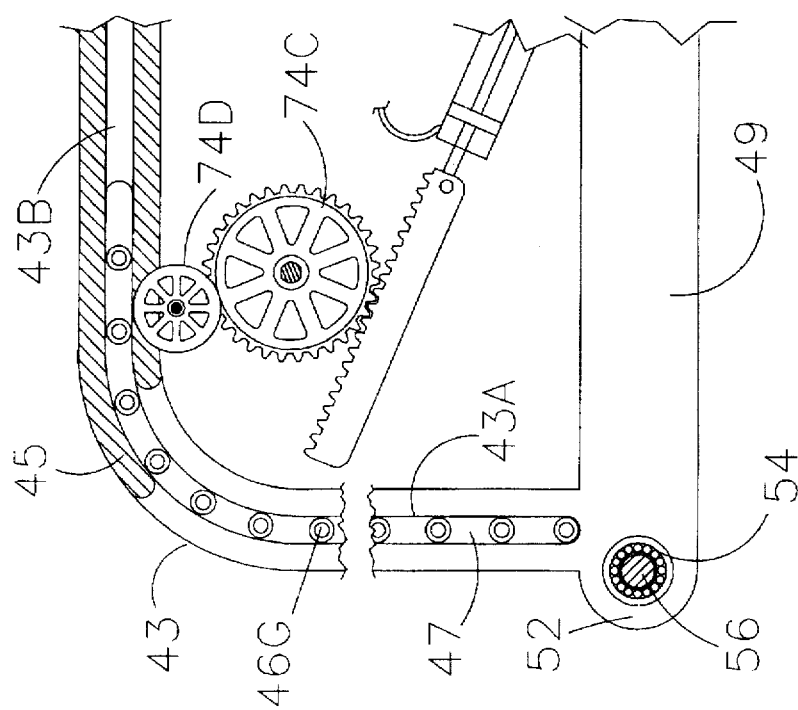
FIG. 11E is an elevated cross sectional side view of FIG. 11D showing closed sliding gate.
Figure 11D:
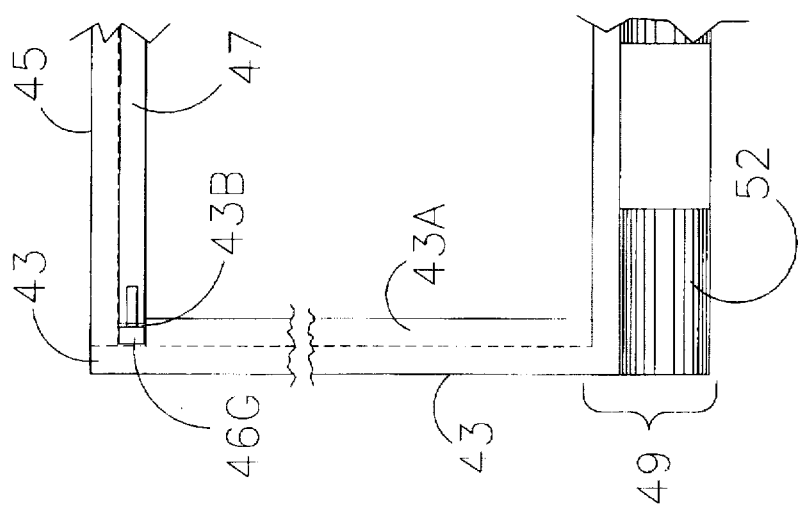
FIG. 11D is an elevated frontal view of a tube segment showing open sliding gate.

FIG. 11D shows the frontal or head view of a tube segment 36 displaying an open sliding gate 47 adjacent to outer side 45 and perpendicular to shoulder wall 43, which also can be an inner panel 44, having a corridor 43A to conduct the movement of rollers 46C attached to said sliding gate 47(FIG. 10). Mechanic and/or hydraulic motive means can assist in moving back and forth said sliding gate 47 to open and close the plenum of said tube segment 36 for a selected period. As in the case of louver gates 46, sliding gates 47 also can be perpendicular to the inner side wall 49.

FIG. 11E shows a cross-sectional side view of FIG. 11D, but additionally displaying a closed sliding gate 47 conducted by said corridor 43A and "upper" corridor 43B on shoulder wall 43. Selectedly, mechanical means similar to those shown by FIGS. 11C and 12, hydraulic means similar to those shown by FIG. 11A or mechanic-hydraulic means as shown by FIGS. 9 and 11B can comprise all or part of the motive means for said sliding gates 47, by controlling the movement of linkage elements as wheels 74C, 74Dor any other linkage means.

Figure 12:
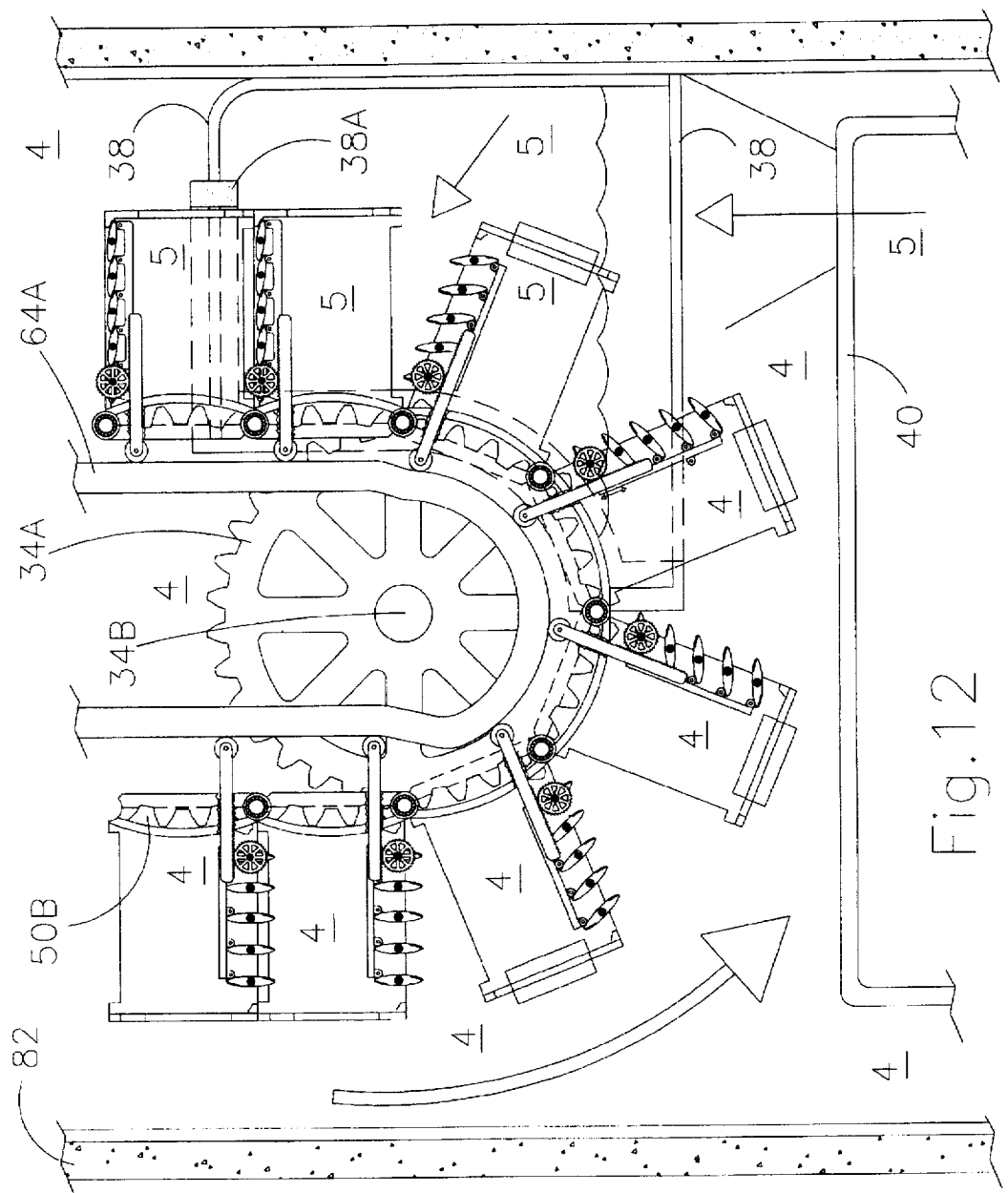
FIG. 12 is a sectional view of the tube segments turning around lower rotor illustrating gas feed from a hood, and an alternative gate moving arrangement; and, FIGS. 13A–D are enlarged views of the multi source heat collector.

FIG. 12 shows the tube segments 36 turning at the lower rotor, where they continuously replace each other to enclose a column of circulating gas 5 which in turn powers them upwardly with its buoyancy power when the tube segments 36 close the louver gates 46. It is shown how, as in a different option than the one presented in FIG. 9, louver gates 46 can be pivotally closed by cam 64A which actuates exclusively mechanic means, and also show how tube segments 36 leave the standing water 4, enter sub-aqueous gas pocket in hood 38 and enclose the column of gas 5 that begins in said gas pocket. Sealing means 38A partially shown, assist to prevent unwanted gas spillage.

Figure 13D:
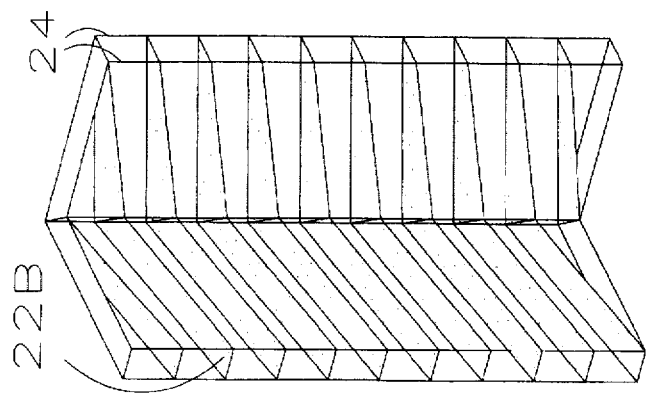
Figure 13C:
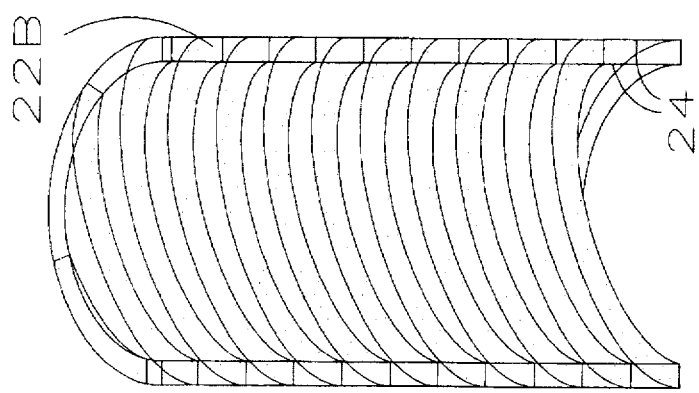
Figure 13B:
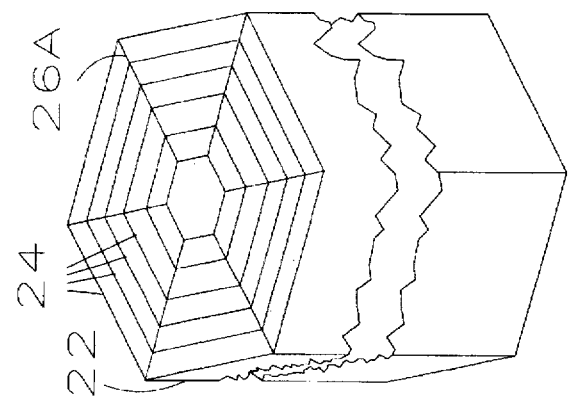
Figure 13A:
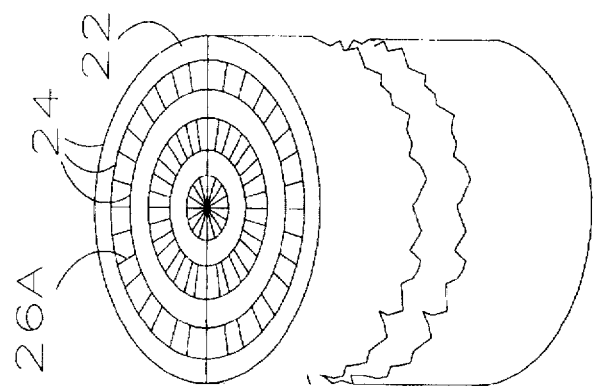

FIG. 13A and FIG. 13B are two options of a Multi source heat collector column 22 which also function as stretchable chamber to pressurize the gas 5 between the surface of an inner fluid and its top, but consisting of an arrangement of concentric tubes 24 separated by slats 26A parallel to the orientation of the concentric tubes 24. In some other embodiments collector 22 is separated by helicoidal slats 22B, thus making possible to convey several kinds of hot fluids through the channels or sub-ducts thus formed preferably in countercurrent to the working gas 5. This multi source heat collector column 22 can be used under surface or on the surface of ground or water. When above-surface, the outermost tube wall side is coated with a black film for solar absorption and is surrounded by said double walled transparent insulating shelter 28.

FIG. 13C and FIG. 13D show sections of two concentric tubes 24 having coiled slats 22B in between. To build up the two complete concentric tubes 24, these sections of concentric tubes must be united with other similar sections or complementary parts.

As in the foregoing construction many changes, adaptations and different arrangements can be made without leaving the principles, objectives or intentions here exposed, it is my desire to make clear that all descripted material, text and drawings should be interpreted only as illustrative and not with limitatory character, particularly as defined in the following claims:

It is hereby claimed:

1. A method of traducing into useful energy the buoyancy power of a circulating generative fluid assisted by a heating means in operative communication with at least one independent high temperature source, said generative fluid rising within a standing liquid and revolving a floturbine essentially composed of an endless sequence of closable tube segments supported by frame means including at least one upper and at least one lower rotor and having at least a rising length, said method comprising the steps of:

a) accumulating the generative fluid in liquid state within circulating means;

b) allowing to flow the liquefied generative fluid powered by its own hydrostatic pressure through heating means to be energized by exposition to the heat of said at least one independent high temperature source;

c) accumulating the energized generative fluid within a funneling inlet chamber or gas accumulator(38) arid within said rising length adjacent thereat such that the tube segments turn on the lower rotor to wall the accumulated generative fluid rising length therein;

d) closing the gates of at least one of said closable tube segments in said rising length causing the endless sequence of tube segments to move around a fixed path thereby generating useful energy;

e) opening the gates of the topmost closable tube segment of said rising length to release the generative fluid.

2. The method of claim 1 in further combination with the method step of after the generative fluid is released from the rising length, capturing, liquefying and re-accumulating the generative fluid in said circulating means for its re-circulation.

3. A method of deriving energy from a temperature differential using heating means fed by independent energy sources, linking-circulating means and a circulating generative fluid having flotation power within a relatively standing liquid and moving a sequence of closable tube segments part of a floturbine having a rising length and substantially submerged in said liquid, said method comprising the steps of:

(a) exposing the generative fluid to the heating means for energizing the fluid;

(b) furnishing via said linking-circulating means the energized generative fluid into a gas accumulator adjacent said flotation turbine;

(c) allowing the closable tube segments to control the energized generative fluid from the accumulator for rising within the liquid along said rising length;

(d) releasing the generative fluid from said closable tube segments at a substantially topmost point of (e) capturing and condensing the released generative fluid in the circulating means using at least an external low temperature source, and (f) recirculating the condensed generative fluid.

4. The method of claim 3 wherein said recirculating is made by:

(a) condensing the generative fluid up to a liquid state and (b) accumulating the liquefied generative fluid up to an amount of weight and height in a portion of an erected pipe of said circulating means such that it can be recirculated through said heating means essentially by pressure of said amount of weight.

5. The method of claim 4 wherein said condensation is a cogenerative condensation performed by binary cycles including floturbines.

6. A system including a floturbine for converting into usable energy the buoyancy power of a circulating generative fluid rising within a standing liquid part of a passageway therefore defining an upstream and a downstream directions, said system comprising:

(a) a closed-loop tube defining an internal plenum;

(b) a support structure including at least one upper and one lower rotors rotatably engaging said closed-loop tube thereon such that same defines a substantially vertical rising length terminated top and bottom by arcuate transition lengths in turn connected by a return length to define said closed-loop tube as substantially continuous and confined to a continuous cyclic path and motion around said rotors;

(c) said closed-loop tube as mounted on said support structure defining an inner side engaging said rotors and being defined by an endless sequence of closable tube segments;

(d) each tube segment having at least one gate with an open mode and a closed mode in which it closes off said internal plenum, and (e) motive means for selectively opening and closing said at least one gate as a function of the position of the respective gate in said cyclic path such that there is always at least one closed gate in said vertical rising length to capture buoyant gas to drive the tube around said cyclic path, whereby the buoyancy power of said generative fluid fills said rising length, and at least one of said closable tube segments closes its gates capturing said buoyancy power for revolving the flotation turbine thus transducing buoyancy into useful energy.

7. The system according to claim 6 wherein the closable tube segments are mutually hinged and coplanarily, nestedly and reliably sealed as to resist gas spillage.

8. The system according to claim 6 wherein said motive means closes each of said gates at a closing section near the top of the vertical length and opens same at said top arcuated transition length such that said vertical rising length substantially defines a gas trapping bucket causing the closed-loop tube and rotors to revolve under action of the buoyant gas.

9. The system according to claim 6 wherein said gates each comprises a louver panel extending transversely across the respective tube segment defining at least one operable louver slat pivotally mounted to pivot between said open and closed modes.

10. The float turbine according to claim 6 wherein said gates each comprises at least one sliding gate mounted in a corridor operationally disposed to extend across the respective tube segment establishing said open and closed modes.

11. The system according to claim 6 further including in said tube segments at least one arcuated section specially indexed to the rotors for attaching engaging means to mesh said closed-loop tube and said rotors.

12. The system according to claim 6 wherein each of said tube segments has at least one inner panel perpendicular at least to said gate means at least to strengthen said tube segments and to assist in holding said gate means.

13. The system according to claim 6 wherein each of said tube segments has at least one void panel perpendicular to said gate means at least to lodge part of said motive means.

14. The system according to claim 6 including substantially non-frictional guide means(51, 51A) mounted in said support structure for providing stabilization and securing a smooth cyclic movement of the closed-loop tube.

15. The system according to claim 6 wherein the generative fluid is steam.

16. The system according to claim 15 wherein the temperature of the standing liquid is at least one hundred degrees centigrade.

17. The system according to claim 6 wherein said at least one gate moves between said open and closed modes and said motive means comprises actuator means, control means and motion transmission means operative therewith to move said at least one gate synchronized with the phases of said cyclic motion according to a predetermined operating schedule.

18. The system according to claim 17 wherein the actuator means include cam means mounted in said support structure and said motion transmission means comprises at least a cam follower operationally connected to said at least one gate.

19. The system according to claim 17 wherein said motion transmission means comprises at least one cam-actuated hydraulic cylinder connected to a servomechanism in turn connected to said motion transmission means and at least one gate.

20. The system according to claim 17 wherein said actuator means comprises at least one hydraulic cylinder mounted between tube segments connected to a servomechanism in turn connected to said motion transmission means and said at least one gate and wherein said hydraulic cylinder is powered by separation and union of said tube segments thereof as same move around the rotors.

21. The system according to claim 17 wherein said control means essentially consist of a servomechanism and signaling means which include a device selected from the group comprising an electromagnetic and a mechanical device keyed to the phase of said cyclic motion by a signal receiver triggered at the passage of at least one of said tube segments.

22. The system according to claim 6 further including condensing means downstream said standing liquid and in operative communication with at least one external low temperature source for condensing the generative fluid up to a liquid state such that same acquires a hydrostatic weight.

23. The system according to claim 22 wherein said condensing means include at least one binary cycle having at least one floturbine.

24. The system according to claim 22 further including pipe means for accumulating and conveying the liquefied generative fluid powered by said hydrostatic weight for its exposition to a heating means upstream said flotation turbine and in operative communication with at least one independent high temperature source.

25. The system according to claim 24 further including means for supplying energized generative fluid from said heating means to said rising length including a funneling gas accumulator to accumulate and expose the energized generative fluid to said closable tube segments adjacent thereat.

26. The system according to claim 24 wherein said heating means are within the standing liquid and include thermal buffer zone to prevent freezing said standing liquid with liquefied generative fluid having a freezing temperature.

27. The system according to claim 26 wherein the generative fluid is ammonia.

* * * * *